Patented Aug. 3, 1943

2,326,047

UNITED STATES PATENT OFFICE 2,326,047

ANTHRAQUINONE COMPOUND

James G. McNally and Joseph B. Dickey, Rochester, N. Y., assignors to Eastman Kodak Company, Rochester, N. Y., a corporation of New Jersey No Drawing. Application April 7, 1939,
Serial No. 266,646

4 Claims. (Cl. 260—379)

This invention relates to the art of dyeing or coloring. More particularly, it relates to new anthraquinone dye compounds.

Organic derivatives of cellulose are characterized by an indifferent affinity for the usual cotton and wool dyes especially the ordinary water soluble dyes. Because of this, it has been necessary to develop new dye compounds suitable for the dyeing or coloration of materials such as textile materials made of or containing organic derivatives of cellulose. It is, accordingly, an object of our invention to provide a new class of anthraquinone dyes suitable for the dyeing or coloration of organic derivatives of cellulose.

A further object of our invention is to provide new water soluble anthraquinone dye compounds. Other objects will hereinafter appear.

Typical organic derivatives of cellulose include the hydrolyzed as well as the unhydrolyzed cellulose organic acid esters, such as cellulose acetate, cellulose formate, cellulose propionate or cellulose butyrate, and the hydrolyzed as well as the unhydrolyzed mixed organic acid esters of cellulose, such as cellulose acetate-propionate, cellulose acetate-butyrate, and the cellulose ethers, such as methyl cellulose, ethyl cellulose or benzyl cellulose.

The anthraquinone dye compounds of our invention are characterized in that they contain an

or an

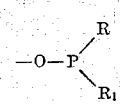

group, wherein R and R₁ each represents an amino group, an O-alkyl group, an O-aryl group, an O-cycloalkyl group, an O-aralkyl group or an O-heterocyclic group and R may be, in addition, an O-X group wherein X represents hydrogen, an alkali forming metal or a non-metallic substituent forming a basic salt, joined to a nitrogen atom which is a nuclear substituent of the anthraquinone nucleus through an aliphatic, cycloalkyl, or aryl radical. It will be understood, of course, that O and P as used herein and in the claims, represent oxygen and phosphorus respectively.

One or more acid ester of phosphorus groups of the character just defined may be present in the anthraquinone dye compounds of our invention. However, as a general rule, no more than two such groups will be present. Again, ordinarily the acid ester of phosphorus group will be present in an α-position of the anthraquinone dye nucleus although it may be in a β-position.

The anthraquinone dye compounds of our invention may contain monovalent substituents in addition to the hereinbefore defined acid ester of phosphorus groups. Where said compounds do contain one or more additional substituents, it may be a halogen atom such as chlorine or bromine, an alkoxy group such as methoxy, ethoxy, propoxy, β-methoxyethoxy, β-ethoxyethoxy, or γ-methoxypropoxy, a hydroxy group, an alkyl group such as methyl, ethyl, propyl, butyl, β-hydroxyethyl, β-methoxyethyl, or β-ethoxyethyl, an alkylamino group such as

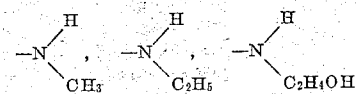

or

a nitro group, or an amino group, for example. It will be understood that the substituent groups just mentioned are intended to be illustrative and not limitative of the invention. Ordinarily substituents, such as those just referred to, will be present in an α-position of the anthraquinone nucleus.

We are aware that anthraquinone dye compounds prepared by causing halides of acids of phosphorus to react upon aminoanthraquinones, which have in at least one amino group at least one substituent containing a hydroxyl group, are known. Compounds of this type are described in British Patent No. 455,092. Examples given therein of aminoanthraquinones which have in at least one amino group at least one substituent containing a hydroyl group are 1-Δ-hydroxybutylaminoanthraquinone, 1 - β - oxy - γ - chloropropylaminoanthraquinone, 1,4 - di-(β-hydroxyethylamino) anthraquinone and anilidoanthraquinones which contain hydroxyl groups in the aromatic residue. Applicants make no claim whatsoever to such dye compounds.

The dye compounds of the prior art, just referred to, appear to be characterized in that they contain an

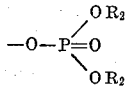

or an

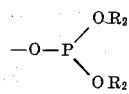

group, wherein $R_2$ represents hydrogen or an alkali metal such as sodium or potassium. The dye compounds of the present invention differ structurally from the prior art compounds just mentioned in that only one of the $R_2$s (in the groups characterizing the prior art compounds) can represent hydrogen or an alkali metal. In the compounds of the present invention, the second $R_2$ must represent an alkyl group, an aryl group, a cycloalkyl group, an aralkyl group, or a heterocyclic group. Further, in the compounds of the present invention, one or both of the —$OR_2$ groupings may be replaced by an amino group.

The compounds of the present invention are further distinguished from the prior art compounds under discussion in that they are principally of importance for the dyeing of organic derivatives of cellulose, such as cellulose acetate, whereas the compounds of British Patent No. 455,092 are principally important as wool dyes and have little or no utility for the dyeing of organic derivatives of cellulose. Compounds of the present invention are further distinguished physically from the compounds of British Patent 455,092 in that as a general rule they are not as water soluble. Thus, from the foregoing, it will be seen that the compounds of the present invention differ both structurally and physically from the compounds of the prior art and in fact are new and distinct compounds.

The compounds of our invention containing an

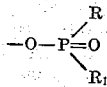

group wherein R and $R_1$ have the meaning previously assigned to them can be prepared by reacting an aminoanthraquinone which has in at least one amino group at least one substituent containing a hydroxyl group joined to a carbon atom with a compound having the general formula:

wherein A represents a halogen atom and B and X each represents an amino group, an O-alkyl, an O-aryl group, an O-cycloalkyl group, an O-aralkyl group or an O-heterocyclic group and B, in addition, may be a halogen atom. When B is a halogen atom, the product initially formed is subjected to hydrolysis to form the desired product.

The compounds of our invention containing an

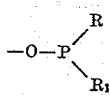

group, wherein R and $R_1$ have the meaning previously assigned to them, can be prepared by reacting an aminoanthraquinone which has in at least one amino group at least one substituent containing a hydroxyl group joined to a carbon atom with a compound having the general formula:

wherein A, B and X have the meaning just assigned to them. When B is a halogen atom, the product initially formed is subjected to hydrolysis to form the desired product.

Compounds having the formula:

wherein B represents a halogen atom and A and X have the meaning previously assigned to them may be prepared by reacting a phosphorus oxyhalide with a compound having the formula R'OH, wherein R' represents an amino, an alkyl, an aryl, a cycloalkyl, an aralkyl, or a heterocyclic group. To illustrate,

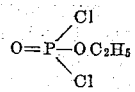

can be prepared by reaction between phosphorus oxychloride, $POCl_3$, and ethyl alcohol. This compound can, in turn, be reacted with an aminoanthraquinone such as α-mono-β-hydroxyethylaminoanthraquinone, a compound which has in at least one amino group at least one substituent containing a hydroxyl group joined to a carbon atom. The reaction can be illustrated as follows:

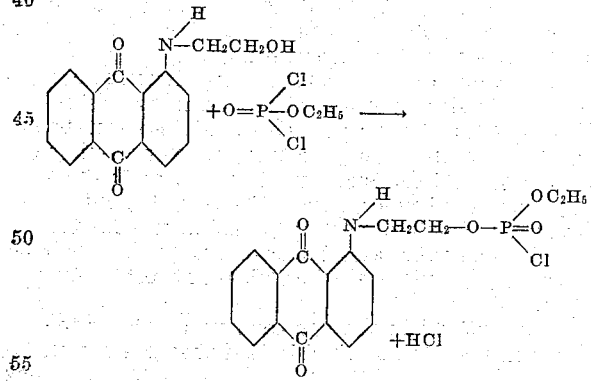

By hydrolysis with sodium hydroxide, for example,

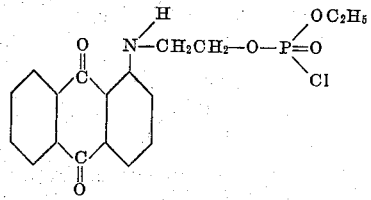

can be converted to

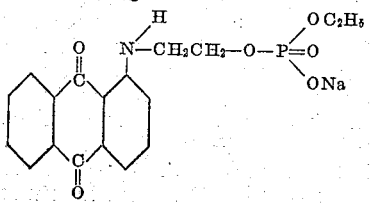

Where B represents an amino group, an O-alkyl group, an O-aryl group, an O-cycloalkyl group, an O-aralkyl group or an O-heterocyclic group, dye compounds within the scope of our invention are obtained directly without hydrolysis. To illustrate, where B is an alkoxy group such as methoxy, and X is methoxy, the reaction proceeds as follows:

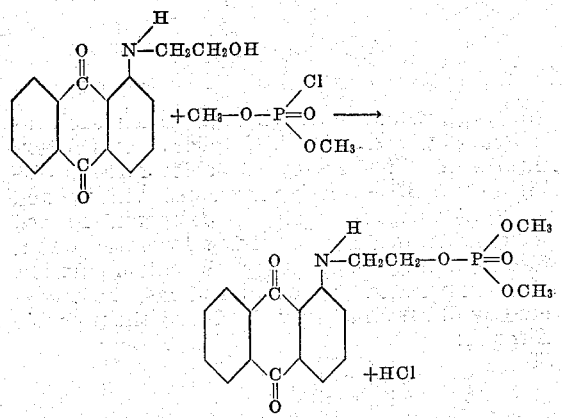

By the substitution of a hydroxyaryl compound such as phenol or naphthol, a hydroxycycloalkyl compound such as cyclobutanol or cyclohexanol or a hydroxyaralkyl compound such as benzyl alcohol or phenyl ethyl alcohol for ethyl alcohol in the reaction with the phosphorus oxyhalide, POCl₃, described above compounds of the general formula:

wherein A and B each represents halogen and X represents O-aryl, O-cycloalkyl or O-aralkyl can be prepared.

Compounds having the formula:

wherein B represents a halogen atom and A and X have the meaning previously assigned to them may be prepared by reacting phosphorus trichloride with a compound having the formula: R'OH, wherein R' has the meaning previously assigned to it. To illustrate,

(in this compound A and B are chlorine and X is —OC₂H₅) can be prepared by reaction between phosphorus trichloride and ethyl alcohol. This compound can, in turn, be reacted with an aminoanthraquinone such as α-mono-β-hydroxyethylaminoanthraquinone to obtain

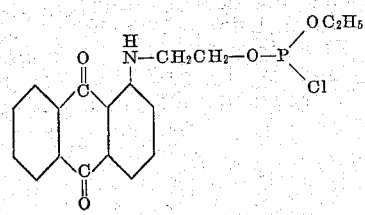

which, upon hydrolysis with sodium hydroxide can be converted to

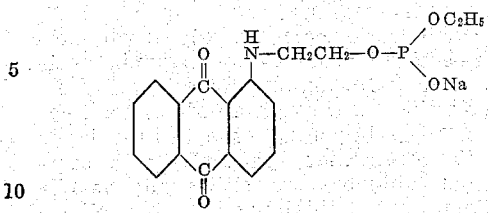

The exact method employed for the preparation of the anthraquinone compounds of our invention is dependent on the compound to be prepared. Where the only substituent to be present is an acid ester of phosphorus group connected through an aliphatic, cycloalkyl, or aryl radical with a nitrogen atom which is a nuclear substituent of the anthraquinone nucleus the compound may be prepared by reacting a hydroxy (aliphatic, cycloalkyl, or aryl)-aminoanthraquinone with a phosphating agent. Where two different acid ester of phosphorus groups are to be present, an anthraquinone compound containing two hydroxy (aliphatic, cycloalkyl, or aryl)-amino groups is reacted, for example, with the two different phosphating agents in succession. It will be understood, of course, that the first reaction is continued only until one equivalent of the phosphating agent is used up.

Where the desired anthraquinone compound is to contain both an acid ester of phosphorus group connected to the anthraquinone nucleus, as stated herein, and another substituent, an amine radical, for example, a leuco anthraquinone, such as leuco quinizarin, may be condensed with a hydroxy (aliphatic, cycloalkyl, or aryl)-amine and another amine, such as ethylamine, following which the compound resulting is phosphated to obtain the compound desired.

Substituents, other than amino substituents, may be introduced in the anthraquinone nucleus by known methods for introducing said substituents.

The reactions above referred to may be carried out in a diluent or solvent medium such as water, ethanol, butanol, benzene, pyridine, dioxane, chloroform or dimethylaniline. Where a condensation involving a leuco anthraquinone is involved, the resulting leuco compound may be oxidized to the non-leuco form in any suitable manner. Where pyridine, for example, is the diluent medium employed, the oxidation may be carried out with air. The oxidation may likewise be carried out employing a perborate oxidizing agent, such as sodium perborate, for example. This latter oxidizing agent is of general utility and may be employed in the case of all the diluent mediums above mentioned.

As previously indicated, the anthraquinone compounds of our invention possess general utility for the dyeing of organic derivatives of cellulose. However, it will be understood, that the compounds employed for this purpose should not contain a sulfonic acid group attached to the nucleus. Again, while the application of our compounds will be more particularly described with reference to cellulose acetate silk, a material to which they are especially adapted, they are of utility for the dyeing of organic derivatives of cellulose, such as those mentioned herein, for example. The compounds of our invention, whether sulfonated or unsulfonated, likewise possess application for the dyeing of wool and silk. The colors yielded on cellulose acetate silk are indicated hereinafter. Generally similar colors are produced on the other organic derivatives of cellulose as well as wool and silk.

While our invention, as more fully shown hereinafter, relates generally to anthraquinone coloring compounds having an acid ester of phosphorus group joined through an aliphatic, a cycloalkyl, or an aryl nucleus to the anthraquinone nucleus, it relates more particularly to compounds containing but one anthraquinone nucleus. Compounds containing but one anthraquinone nucleus and wherein the connecting linkage is an aliphatic radical, especially an alkylene radical containing at least two carbon atoms, are generally advantageous for the dyeing of organic derivatives of cellulose.

The following examples illustrate the method of preparation of the anthraquinone compounds of our invention.

*Example 1*

9.2 grams of ethyl alcohol are slowly added with stirring to 31.7 grams of phosphorus oxychloride in 60 cc. of dry chloroform. The reaction mixture is warmed slightly to complete the reaction which takes place.

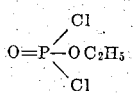

is formed and may be recovered by distilling off the chloroform.

32.4 grams of 1,4-di-β-hydroxyethylaminoanthraquinone are placed in 500 cc. of chloroform, heated to boiling and the compound prepared as described above is slowly added with stirring. Hydrogen chloride is evolved during the reaction and when its evolution ceases, the chloroform is distilled off and the residue is treated with ice and sodium carbonate. The dye compound formed is purified by dissolving in warm water, filtering and precipitating by the addition of sodium chloride. The precipitated dye is recovered by filtration and dried. It has the probable formula:

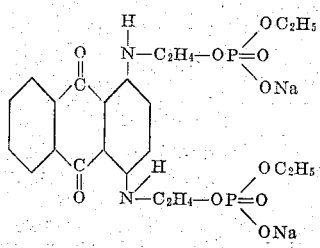

and dyes cellulose acetate silk blue from a water solution.

By the substitution of an equivalent molecular weight of 1-β-hydroxethylamino-4-γ-hydroxypropylamino anthraquinone for the 1,4-di-β-hydroxyethylamino anthraquinone, a dye having the probable formula:

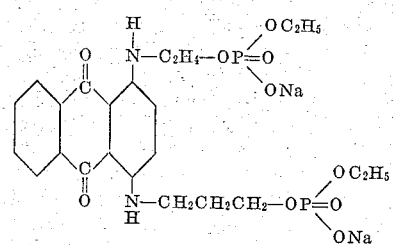

is obtained. Cellulose acetate silk is likewise dyed blue from water solutions of this dye compound. In employing the compounds of this and the following examples as dyes, they may be applied to the material undergoing dyeing or coloration from water solutions or suspensions which may contain sodium chloride.

*Example 2*

30.8 grams of 1-ethylamino-4-β-hydroxyethylamino anthraquinone are added to 500 cc. of chloroform, heated to boiling and 19.1 grams of

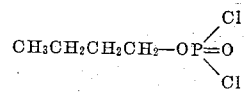

are slowly added with stirring. When the evolution of hydrogen chloride, which is formed during the reaction, ceases, the chloroform is distilled off and the residue is treated with ice and sodium carbonate. The dye compound formed may be purified by dissolving in warm water, filtering, and precipitating with sodium chloride. The precipitated dye compound may be recovered by filtration and dried. It has the probable formula:

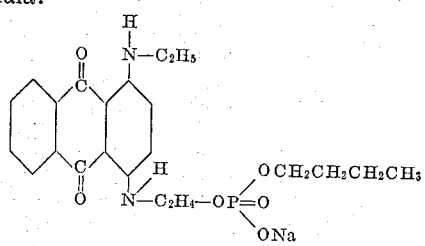

and dyes cellulose acetate blue from an aqueous solution which may contain sodium chloride.

*Example 3*

7.6 grams of methyl cellosolve are slowly added with stirring to 16 grams of phosphorus oxychloride in 50 cc. of chloroform. The reaction mixture may be warmed slightly to complete the reaction following which the product formed may be recovered by distilling off the chloroform.

38.7 grams of 1-n-butylamino-4-p-hydroxycyclohexylamino anthraquinone are added to 600 cc. of chloroform heated to boiling and the compound prepared as described above is slowly added with stirring. Upon completion of the reaction, the reaction product is worked up as described in Examples 1 and 2. The dye compound formed has the probable formula:

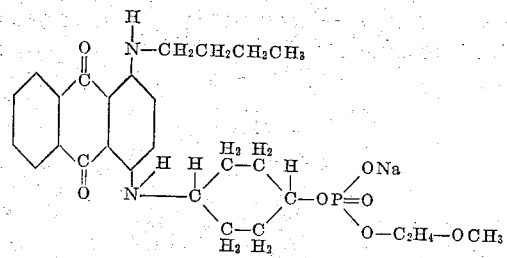

and dyes cellulose acetate silk blue from a water solution which may contain sodium chloride.

*Example 4*

43.9 grams of 1-tetrahydrofurfurylamino-4,5-di-β-hydroxyethylamino-8-hydroxy anthraquinone are added to 600 cc. of chloroform containing 20 grams of dry pyridine. The resulting mixture is heated to boiling and 16.3 grams of

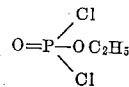

are slowly added with stirring. The reaction product is worked up in the same manner as described in Examples 1 and 2. A dye compound is obtained in which the β-hydroxyethylamino group in the 4-position is replaced by the

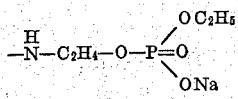

grouping. The dye compound obtained dyes cellulose acetate silk a bluish green shade from an aqueous solution which may contain sodium chloride.

*Example 5*

42 grams of 4-p-hydroxyphenylamino-1-benzylamino anthraquinone are dissolved in an aqueous sodium carbonate solution and treated in the cold with

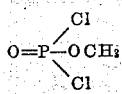

The reaction may likewise be carried out in chloroform with or without the presence of a base. Upon working up the reaction product, a compound is obtained which has the probable formula:

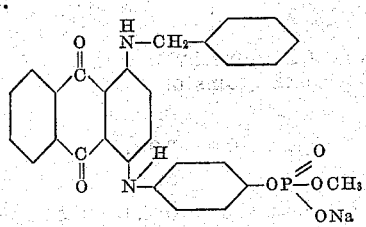

and which dyes cellulose acetate silk blue from a water solution.

By the substitution of an equivalent molecular weight of 4-p-hydroxyphenylamino-1-cyclohexylamino anthraquinone and 4-p-hydroxyphenylamino-1-pyridino anthraquinone, respectively, for the 4-p-hydroxyphenylamino-1-benzylamino anthraquinone of the example and treating as described in the example, dye compounds corresponding to that just described, but in which the benzylamino group is replaced by the cyclohexylamino or pyridino group, may be obtained. These compounds likewise dye cellulose acetate silk blue from their water solutions.

*Example 6*

24 grams of leuco quinizarin are dissolved in 200 cc. of normal butyl alcohol and reacted with 3.2 grams of methylamine. Upon completion of the reaction, 25 grams of

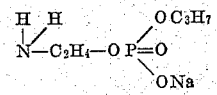

are added and the reaction mixture is heated until reaction is complete. The leuco dye formed is poured into water and oxidized in the usual manner with sodium perborate after which the dye is precipitated by the addition of sodium chloride, filtered, washed and dried. An anthraquinone dye compound is obtained in which there is a methylamino group in the 1-position and a

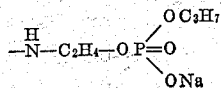

group in the 4-position. This dye compound colors cellulose acetate silk a blue shade from its water solution.

*Example 7*

37.3 grams of 1,5-diethylamino-4-bromoanthraquinone are heated in 500 cc. of pyridine with 40 grams of

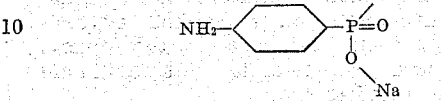

and one gram of copper oxide. Upon completion of the reaction, all or nearly all of the pyridine is distilled off and the residue is poured into water. The desired dye compound may be precipitated by the addition of sodium chloride, filtered, washed and dried. It has the probable formula:

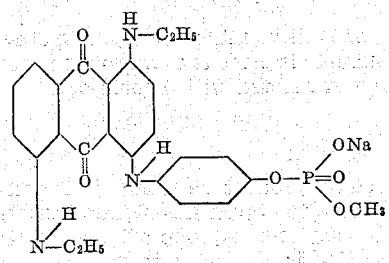

and dyes cellulose acetate silk a bluish green shade from its aqueous solution.

*Example 8*

24 grams of leuco quinizarin, 200 grams of normal butyl alcohol, and 50 grams of

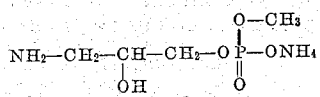

are refluxed together for about six hours. The reaction mixture resulting is poured into water and oxidized in the usual manner with an alkaline perborate such as sodium perborate. The dye compound formed can be recovered by salting out with sodium chloride, filtering, washing and drying. An anthraquinone dye compound containing a group having the probable formula:

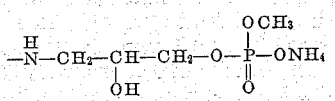

in each of the 1 and 4-positions is obtained. This dye compound colors cellulose acetate silk deep blue shades from a water suspension.

The dye compound of this example may, likewise, be prepared by treating quinizarin with the amine given in the example in water on a steam bath.

*Example 9*

36 grams of

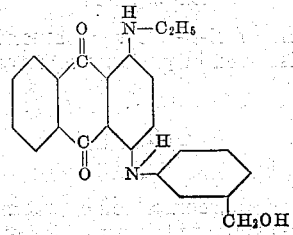

are added to 600 cc. of chloroform and reacted with one molecular equivalent weight of

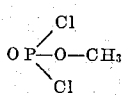

The dye compound formed may be recovered by working up the reaction mixture in the usual manner. A dye compound is obtained in which the —CH₂OH group attached to the phenyl nucleus in the 4-position of the anthraquinone nucleus is converted to the

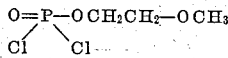

grouping. This dye compound dyes cellulose acetate silk a blue shade.

*Example 10*

1 mole of 1-ethylamino-4-β-hydroxyethylamino anthraquinone is placed in chloroform containing pyridine and reacted with 1 mole of

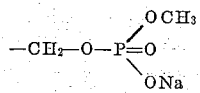

The reaction product resulting is reacted with ethanolamine to obtain a compound wherein the β-hydroxyethylamino group originally present in the 4-position is converted to a

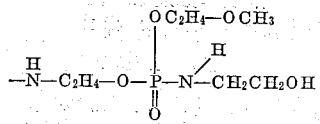

group. The dye compound colors cellulose acetate silk a blue shade from an aqueous suspension.

*Example 11*

37.2 grams of 1-methylamino-4-β-hydroxyethylamino anthraquinone are dissolved in dry pyridine and treated with 14.5 grams of

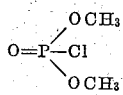

Upon completion of the reaction, the reaction mixture is allowed to stand for some time after which it is poured into water. The dye compound formed may be recovered by filtration, washed with water and dried. By the above treatment, a dye compound is obtained in which the β-hydroxyethylamino group originally present in the 4-position is converted to a

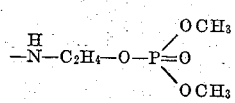

group. This dye compound colors cellulose acetate silk a blue shade from an aqueous suspension.

*Example 12*

29.2 grams of N-β-hydroxyethylanthrapyrimidone are dissolved in pyridine and treated in the cold with

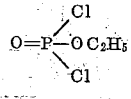

and the reaction is completed by warming. Aqueous sodium carbonate is then added and the pyridine is removed by steam distillation. The dye compound formed is precipitated by the addition of sodium chloride, recovered by filtration, washed and dried. The dye compound obtained has the probable formula:

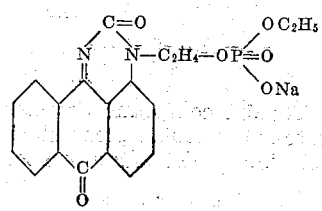

and dyes cellulose acetate silk a yellow shade from an aqueous solution.

*Example 13*

43.7 grams of the anthrapyridone having the formula:

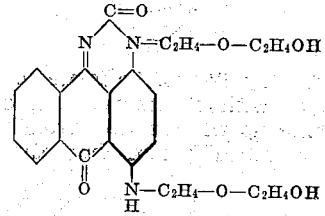

are dissolved in dimethylaniline and treated in the cold with 16 grams of

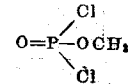

following which the reaction is completed by warming. The dye compound formed is worked up and recovered in the usual manner. The dye compound obtained has, in the form of its ammonium salt, the probable formula:

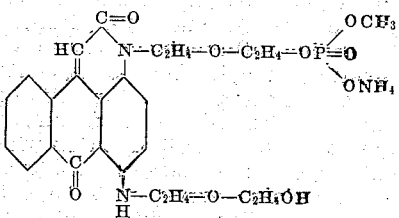

and dyes cellulose acetate silk a violet red shade from an aqueous solution.

*Example 14*

.1 gram mole of the anthraquinone dye having the formula:

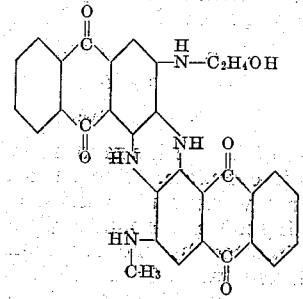

is treated in dimethylcyclohexylamine with .1 gram mole of

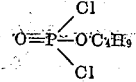

as described in Example 12. The dye compound is worked up in the usual manner. By the above treatment, a dye compound is obtained in which the β-hydroxyethylamino group originally present is converted to the group which, in its calcium salt form, has most probably the formula:

$$-\overset{H}{N}-C_2H_4-O-P{\overset{OC_4H_9}{\underset{OCa/2}{=}}}O$$

This dye compound dyes cellulose acetate silk a blue shade.

*Example 15*

32 grams of the pyrazoleanthrone having the formula:

[structure of pyrazoleanthrone with N—N—C₃H₆OH(γ) group]

are treated in pyridine with one equivalent of $$O=P{\overset{Cl}{\underset{Cl}{-N{\overset{CH_3}{\underset{CH_3}{}}}}}}$$

The reaction may be conducted as described in Example 12 and the reaction product may be worked up as described in said example. A dye compound is obtained in which the γ-hydroxypropyl group originally present is converted to a group which has the probable formula:

$$-C_3H_6-O-P{\overset{ONa}{\underset{N{\overset{CH_3}{\underset{CH_3}{}}}}{=}}}O\ CH_3$$

The dye compound obtained dyes cellulose acetate silk a yellow shade.

*Example 16*

28.5 grams of β-hydroxyethylaminobenzanthrone are treated in pyridine with one equivalent of $$O=P{\overset{Cl}{\underset{OCH_3}{-OCH_3}}}$$

The reaction may be carried out as described in Example 12 and the reaction product may also be worked up as described in said example. The dye compound obtained has the probable formula:

[structure with $\overset{H}{N}-C_2H_4-OP{\overset{OCH_3}{\underset{OCH_3}{=}}}O$ group on benzanthrone]

and dyes cellulose acetate silk a red shade.

*Example 17*

An anthraquinone acridone dye having the formula:

[anthraquinone acridone structure with NH, OH, and N—CH₃ groups]

is treated in the cold with POCl₃ in pyridine and the reaction is completed by warming. The compound resulting is treated with ammonia and the dye compound formed is worked up in the usual manner. A dye compound is obtained in which the hydroxyl group attached to the phenyl nucleus is converted to a $$-O-P{\overset{NH_2}{\underset{NH_2}{=}}}O$$

group. This dye compound dyes cellulose acetate silk a blue shade.

*Example 18*

28.3 grams of 1-β-hydroxyethylaminoanthraquinone are dissolved in 300 cc. of pyridine heated to 70° C. and 22 grams of monoamyloxyphosphorus dichloride in 200 cc. of pyridine are added dropwise with stirring while maintaining the temperature at 70° C. Stirring and heating are continued for seven hours following which the reaction mixture is poured into 200 cc. of water containing 16 grams of sodium carbonate. The mixture is concentrated to about one-fourth its volume under reduced pressure and upon cooling the desired dye compound crystallizes following which it is recovered by filtration, washed with water and dried. By the above treatment, a dye containing the $$-\overset{H}{N}-C_2H_4-OP{\overset{OCH_2CH_2CH_2CH_2CH_3}{\underset{ONa}{}}}$$

grouping instead of the original β-hydroxyethylamino group is obtained. This dye compound colors cellulose acetate silk, wool, and silk purple shades.

*Example 19*

31 grams of 1,4-di-β-hydroxyethylamino anthraquinone are dissolved in pyridine and reacted with 13 grams of dimethoxy phosphorus chloride in accordance with the method described more particularly in Example 18. By this reaction a dye compound in which one of the β-hydroxyethylamino groups is replaced by the $$-\overset{H}{N}-C_2H_4-OP{\overset{OCH_3}{\underset{OCH_3}{}}}$$

grouping is obtained. This dye compound colors cellulose acetate silk a blue shade from an aqueous suspension.

*Example 20*

37 grams of 1-β-hydroxyethylamino-4-γ-hydroxypropylamino - 5,8 - dihydroxyanthraquinone are dissolved in 400 cc. of pyridine and reacted as in Example 18 with 30 grams of methoxyethoxyphosphorus chloride. The dye compound is worked up in the usual manner and contains a

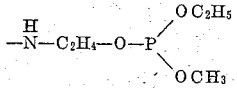

group in the 1-position and a

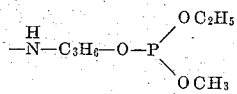

group in the 4-position in place of the β-hydroxyethylamino and γ-hydroxypropylamino groups originally present in these positions. This dye compound colors cellulose acetate silk a greenish-blue shade from an aqueous suspension.

*Example 21*

37 grams of 1,4,5-tri-β-hydroxyethylamino anthraquinone are dissolved in pyridine and reacted with 25 grams of

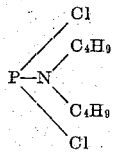

in accordance with the method described in Example 18. The dye compound is worked up in known fashion. By the above treatment, a dye compound is obtained in which the β-hydroxyethylamino group originally present in the 1-position is converted to a group having the probable formula:

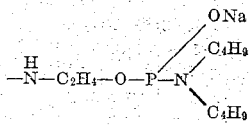

This dye compound colors cellulose acetate silk, wool, and silk greenish blue shades.

*Example 22*

31 grams of leuco-1-β-hydroxyethylamino-4-phenylaminoanthraquinone are dissolved in a half and half mixture of dioxane and pyridine and treated at 70° C. with 20 grams of

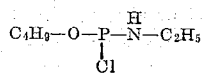

in accordance with the method described in Example 18. The leuco dye compound formed is oxidized by passing in air and the reaction mixture worked up as described in Example 18. A dye compound is obtained in which the β-hydroxyethylamino group present in the 1-position is converted into a group having the probable formula:

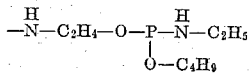

This dye compound colors cellulose acetate silk a blue shade.

*Example 23*

.1 gram mole of leuco quinizarin, .1 gram mole of p-β-hydroxyphenetidine and 100 cc. of butanol are heated under reflux for six hours. The resulting leuco dye is then poured into water and oxidized with alkaline sodium perborate. The dye compound formed is recovered from the mixture, dried and placed in 500 cc. of dry chloroform following which it is treated with .1 gram mole of

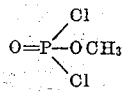

The reaction mixture is warmed to complete the reaction. Chloroform is removed by distillation and the residue remaining is treated with aqueous sodium bicarbonate, dissolved in hot water and filtered. The dye compound formed is precipitated by the addition of sodium chloride, recovered by filtration and dried. By the above treatment, an anthraquinone dye containing a

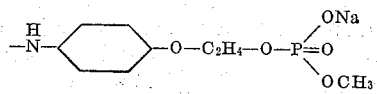

group in the 1-position and a hydroxy group in the 4-position is obtained. This dye compound dyes cellulose acetate silk a purple shade.

*Example 24*

.1 gram mole of a leuco anthraquinone containing a

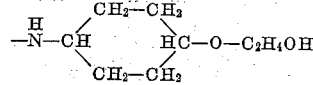

group in an α-position is treated with a phosphating agent such as

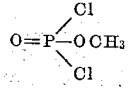

The leuco dye compound resulting is oxidized and worked up in the usual manner to obtain a non-leuco anthraquinone compound containing a

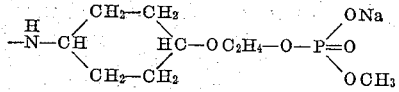

group in an α-position. Dye compounds of this general structure ordinarily yield blue shades on cellulose acetate silk.

By subjecting anthraquinone compounds containing a β'-hydroxy-β-ethoxyethylamino group or a β''-hydroxy-β'-ethoxy-β-ethoxyethylamino group in an α-position to treatment with the phosphating agents of our invention, acid ester of phosphorus groups may be substituted for the hydrogen atom of said hydroxy groups.

The dye compounds of our invention include anthraquinone compounds containing a

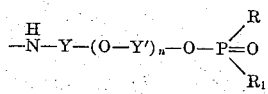

or a

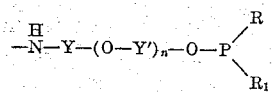

group, wherein Y and Y' each represents an aliphatic, cycloalkyl, or aryl residue, $n$ represents a small whole number above 0 such as 1, 2, 3, or 4, and R and $R_1$ have the meaning previously assigned to them, attached to the anthraquinone nucleus. Ordinarily Y and Y' represent an alkylene radical such as ethylene. However, they can be, for example, the residue of a cyclohexyl or phenyl nucleus. The preparation of anthraquinone compounds containing the specific groups designated above is more particularly indicated in Examples 23 and 24. Their method of preparation is believed to be clear from the foregoing description.

In further illustration of compounds containing the above groups may be mentioned

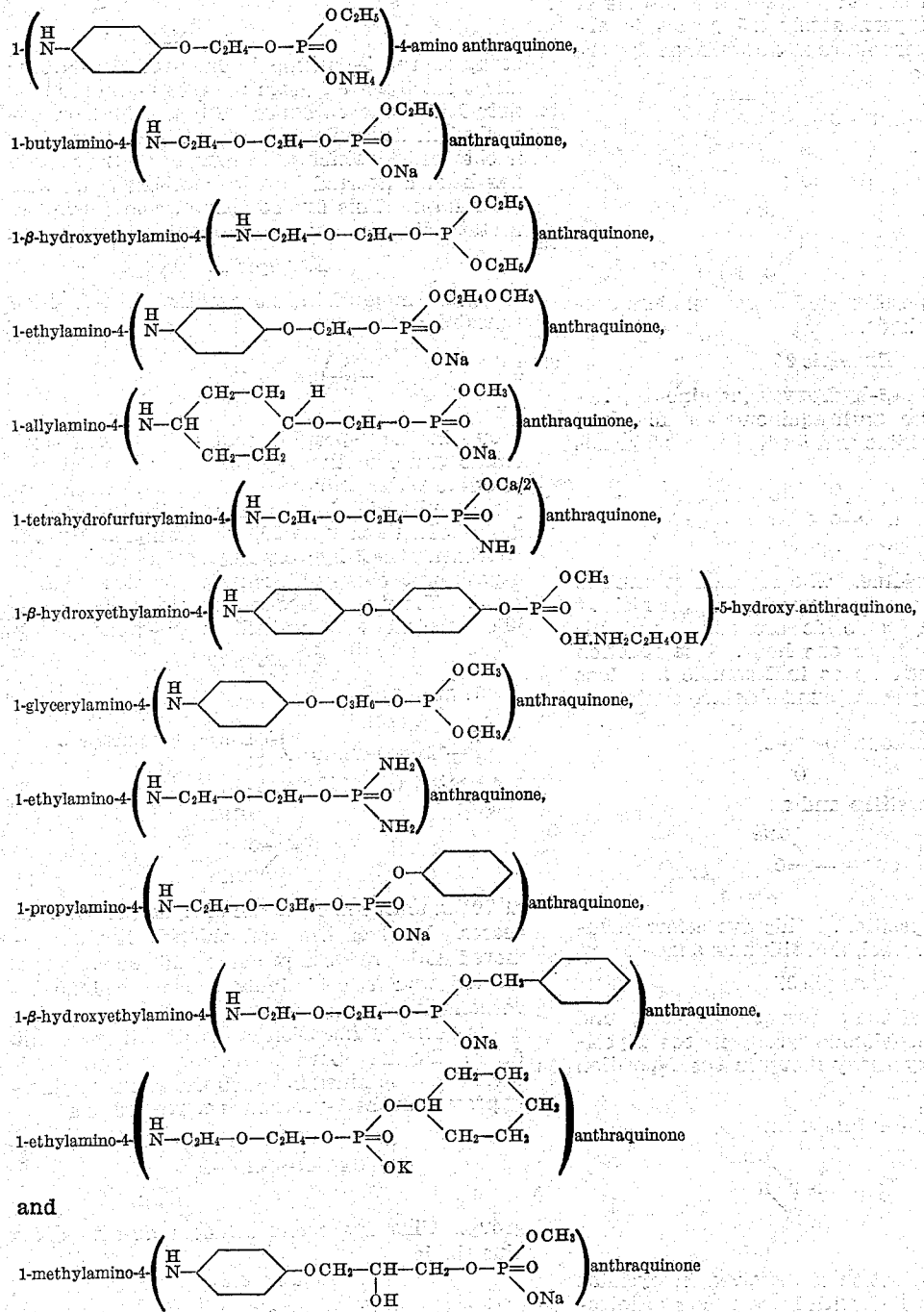

and

Anthraquinone dye compounds, included within the scope of our invention and containing, in addition to an acid ester of phosphorus group, an organic acid ester group, constitute a very valuable series of dyes. While these compounds relate broadly to any organic acid ester group, they relate more particularly to organic acid ester groups having the formula:

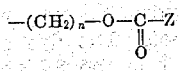

wherein $n$ represents a small whole number above zero, such as 1, 2, 3, or 4 and Z represents an alkyl, an aryl or a furyl radical. The preparation of compounds of this type is illustrated in the examples which follow.

*Example 25*

1.9 grams of 1-β-hydroxyethylaminomonobenzoate-4-β-hydroxyethylamino anthraquinone are added to 30 cc. of pyridine and 1.7 grams of

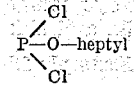

in 30 cc. of pyridine are added with stirring. The reaction mixture is heated at 70° C. for seven hours and allowed to stand overnight following which it is poured into 100 cc. of water containing 1 gram of sodium carbonate. The solution resulting is filtered and evaporated to dryness under reduced pressure. The residue is then extracted several times with hot ethanol following which the alcohol solution obtained is filtered. The alcohol is removed whereupon a residue of dye weighing approximately 2.5 grams is obtained. The water soluble anthraquinone dye obtained contains a

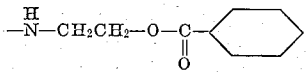

group in the 1-position and a

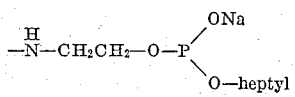

group in the 4-position and colors cellulose acetate silk a blue shade.

*Example 26*

34 grams of 1-β-hydroxyethylamino-4-γ-hydroxypropylamino anthraquinone are dissolved in 500 cc. of pyridine and treated with 25 grams of

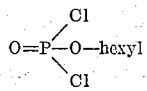

in 200 cc. of pyridine. The reaction mixture is added to 70° C. for six hours following which 14 grams of caproyl chloride are added and the heating continued for one hour. The reaction product is worked up as in Example 25. The anthraquinone dye compound obtained contains a

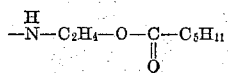

group in the 1-position and a

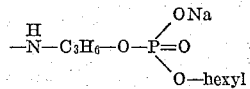

group in the 4-position. This dye colors cellulose acetate silk, wool, and silk blue shades.

*Example 27*

1 gram mole of the anthraquinone compound containing a phenylamino group in the 1-position, a β-hydroxyethoxy group in the 2-position and a

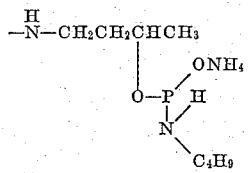

group in the 4-position is dissolved in pyridine and treated at 100° C. with 1 gram mole of tetrahydrofuroic anhydride. The pyridine is partly removed under reduced pressure and the dye compound formed allowed to crystallize. By the above treatment, the β-hydroxyethoxy group in the 2-position is converted to the tetrahydrofuroate form. The dye compound formed colors cellulose acetate silk, and silk blue shades.

*Example 28*

1 gram mole of the anthraquinone compound containing a cyclohexylamino group in the 1-position, a

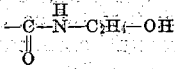

group in the 2-position, a methylamino group in the 4-position, and a

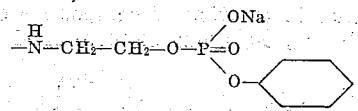

group in the 5-position is dissolved in pyridine and treated with 1 gram mole of methoxyacetic anhydride in accordance with the method described in Example 27. An anthraquinone dye is obtained in which the group in the 2-position has been converted into its methoxyacetic acid ester form. This dye compound colors cellulose acetate silk, wool, and silk greenish-blue shades.

*Example 29*

1 gram mole of the anthraquinone compound containing a

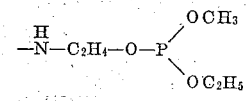

group in the 1-position and a β-hydroxyethylamino group in the 4-position is dissolved in a pyridine-water mixture and treated with propionic anhydride in accordance with the method described in Example 25, for example. By this treatment, the β-hydroxyethylamino group in the 4-position is changed into its propionic acid ester form. The dye compound obtained colors cellulose acetate, wool, and silk bluish-green shades.

*Example 30*

34.7 grams of

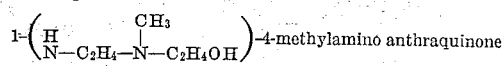

are heated with 140 grams of

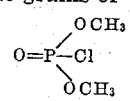

at 70° C. until the evolution of hydrogen chloride ceases. Most of the acid chloride is then removed under reduced pressure and the residue is treated with a cold dilute aqueous sodium bicarbonate solution. The dye compound formed is recovered by filtration, washed with water and dried. By the above treatment, an anthraquinone dye is obtained in which the group originally present in the 1-position is converted to a

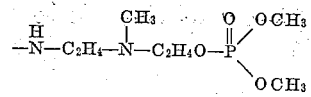

group. This dye colors cellulose acetate silk a blue shade.

*Example 31*

32.6 grams of 1,4-di-β-hydroxyethylamino anthraquinone are heated at 70° C. with 100 grams of

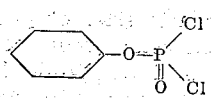

until the evolution of hydrogen chloride ceases. Excess acid chloride is removed under reduced pressure and the residue resulting is treated with dilute sodium hydroxide, warmed with water and filtered while hot. The dye compound formed is precipitated from the filtrate by the addition of sodium chloride, recovered by filtration, washed with water and dried. By the above treatment, an anthraquinone dye is obtained containing a

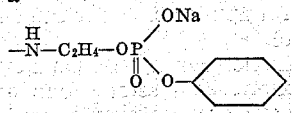

group in each of the 1 and 4 positions. This dye colors cellulose acetate silk a blue shade.

*Example 32*

3.3 grams of 1,4-di-β-hydroxyethylamino anthraquinone are dissolved in 50 cc. of pyridine and 2.25 grams of monoamyl phosphorylchloride dissolved in 25 cc. of pyridine are slowly added with stirring. The reaction mixture resulting is heated on a water bath at 70° C. for seven hours after which it is left to stand overnight at room temperature. The mixture resulting is poured into 200 cc. of a dilute sodium carbonate solution to effect hydrolysis and this solution is evaporated to dryness under reduced pressure. The residue remaining after the evaporation is extracted with ethyl alcohol following which the alcohol solution is filtered. The residue remaining after evaporation of the alcohol extract and which constitutes the desired dye product weighs 4.3 grams. The dye compound obtained contains a

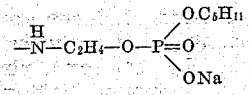

group in the 1-position and a β-hydroxyethylamino group in the 4-position and colors cellulose acetate silk a blue shade.

By reaction of 3.3 grams of 1,4-di-β-hydroxyethylamino anthraquinone with 2 grams of butyl phosphoric acid dichloride in accordance with the procedure described above, a yield of 4 grams of

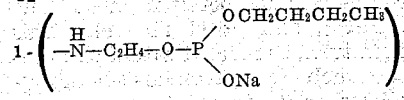

4-β-hydroxyethylamino anthraquinone can be obtained. This dye compound colors cellulose acetate silk a blue shade.

Similarly, by reaction of 3.5 grams of ethyl phosphoric acid dichloride with 3.3 grams of 1,4-di-β-hydroxyethylamino anthraquinone in accordance with the above procedure, 5.5 grams of the anthraquinone dye having a

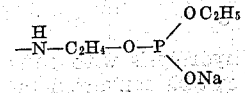

group in each of the 1 and 4 positions can be obtained. This dye compound colors cellulose acetate silk a blue shade.

It will be understood that the foregoing examples are intended to be illustrative and not limitative of the compounds of our invention. Compounds containing a

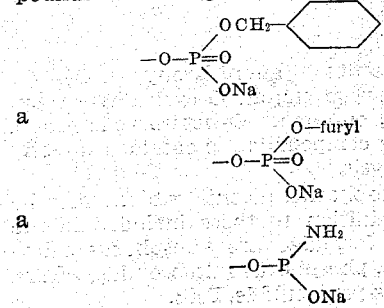

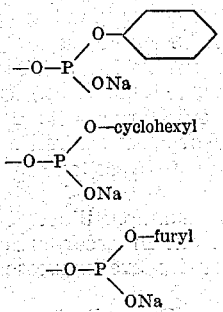

group, for example, joined to a nuclear nitrogen atom in the manner described herein can also be prepared in accordance with the methods hereinbefore described. Similarly when R and R₁, for example, are aryl the aryl nucleus may be substituted. Representative of suitable substituents may be mentioned a halogen atom, such as chlorine, bromine or iodine, an alkyl group, a nitro group and a hydroxy group. Suitable connecting linkages for joining the acid ester of phosphorus group to the nuclear nitrogen atom, in addition to those previously shown, include, for example, butylene and the residue of cyclobutyl.

Again, while those compounds obtained in the form of a salt have been shown, for the most part, in their sodium salt form it will be understood that they can be prepared in the form of the salts previously set forth. They may, for example, be in the form of their potassium, ammonium, calcium, ethanolamine or pyridine salt. Since the method of preparation of these various salts is believed to be clear to those skilled in the art to which our invention is directed, no detailed description of their preparation has been given.

The anthraquinone dye compounds of our invention are, for the most part, soluble in water and may be applied to the material undergoing dyeing from an aqueous solution of the dye. Those compounds which are insoluble or sufficiently insoluble in water, as to render the use of a dispersing or solubilizing agent advantageous, may be employed for the direct dyeing of textile materials by grinding the dye to a fine powder, intimately mixing it with a suitable dispersing or solubilizing agent and adding the resulting mixture to water or a dilute solution of soap in water to form an aqueous dyebath. Following this known preparation of the dyebath, the textile material or materials to be dyed may be added to the dyebath and the dyeing operation conducted in known fashion. If desired, common salt may be added to promote exhaustion of the dyebath.

Dyeing operations can be conducted advantageously at a temperature of 80–85° C. but any suitable temperature may be employed. In accordance with the usual dyeing practice, the material to be dyed will ordinarily be added to the dyebath at a temperature lower than that at which the main portion of the dyeing is to be effected, a temperature approximating 45–55° C., for example, following which the temperature of the dyebath will be raised to that selected for carrying out the dyeing operation. The temperature at which the dyeing is conducted will vary somewhat depending on the particular material or materials undergoing coloration. It will be understood that the anthraquinone dye compounds of our invention may be applied to the material to be colored in any suitable manner. Coloration may be effected, for example, by dyeing, printing, or stencilling. Dispersing or solubilizing agents that can be employed for preparing suspensions of the insoluble or relatively insoluble dye compounds include soap, sulphoricinoleic acid, a salt of sulphoricinoleic acid, and sulfonated oleic, stearic, or palmitic acid or salts thereof, such, for instance, as the sodium or ammonium salts.

The following example illustrates how dyeing may be carried out in accordance with our invention. Quantities are expressed in parts by weight.

Example A 2.5 parts of the dye compound of Example 2 are added to 834 parts of water heated to 45–55° C. and 100 parts of cellulose acetate in the form of threads, fibers, or fabric, for example, are entered and the temperature raised to 80–85° C. The cellulose acetate is worked at this temperature until dyeing is complete. The cellulose acetate is dyed a blue shade. If desired, sodium chloride can be added to aid in controlling the depth of dyeing and to promote exhaustion of the dyebath.

Where an insoluble or relatively insoluble dye compound of our invention is employed as the dye, it will, as previously noted, be first subjected to a dispersing or solubilizing treatment following which the dyeing operation may be carried out in accordance with the general method described above.

While our invention has been illustrated in connection with the dyeing of cellulose acetate silk, it will be understood that dyeing operations can be carried out in a manner similar to that described above by the substitution of another organic derivative of cellulose material or wool or silk for cellulose acetate silk or by employing a dye compound other than that employed in the example or by substitution of both the material being dyed and the dye compound of the example.

We have further discovered that anthraquinone coloring compounds containing a thiophosphoric acid ester group joined to a nitrogen atom which is a nuclear substituent of the anthraquinone nucleus through an aliphatic, cycloalkyl, or aryl radical, similarly to the acid ester of phosphorus compounds previously described, are likewise of utility for the dyeing of organic derivatives of cellulose, wool and silk.

Said thiophosphoric acid ester group can be represented, for the most part, by the general formula:

wherein R and R₁ each represents an amino group, an O-alkyl group, an O-aryl group, an O-cycloalkyl group, an O-aralkyl group, an O-heterocyclic group or an O—X group, wherein X represents hydrogen, an alkali forming metal or a non-metallic substituent forming a basic salt.

When the above compounds are to be employed for the dyeing of an organic derivative of cellulose, such as cellulose acetate silk, they should not contain a nuclear sulfonic acid group and preferably no carboxylic acid group should be present in the anthraquinone nucleus. Further, compounds of the character above described wherein R and R₁ both represent an O—X group have not been found to be of much utility for the dyeing of organic derivatives of cellulose. The anthraquinone compounds described, whether sulfonated or unsulfonated, appear to possess rather general applicability for the coloration of silk and wool.

Anthraquinone coloring compounds containing a thiophosphoric acid ester group can be prepared by reacting an aminoanthraquinone which has in at least one amino group at least one substituent containing a hydroxyl group joined to a carbon atom with a compound having the general formula:

wherein A represetns a halogen atom and B and X each represents an amino group, an O-alkyl, an O-aryl group, an O-cycloalkyl group, an O-aralkyl group or an O-heterocyclic group and B, in addition, may be a halogen atom. When B is a halogen atom, the product initially formed is subjected to hydrolysis to form the desired product.

Compounds having the formula:

wherein B represents a halogen atom and A and X have the meaning previously assigned to them may be prepared by reacting a phosphorus sulfohalide with a compound having the formula R'OH wherein R' represents an amino, an alkyl, an aryl, a cycloalkyl, an aralkyl, or a heterocyclic group. To illustrate,

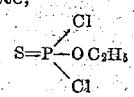

can be prepared by reaction between phosphorus sulfochloride, PSCl₃, and ethyl alcohol. This compound can, in turn, be reacted with an aminoanthraquinone such as α-mono-β-hydroxy-ethylaminoanthraquinone to obtain

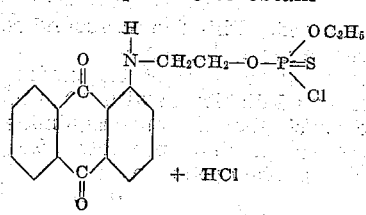

which, upon hydrolysis with sodium hydroxide, for example, can be converted to

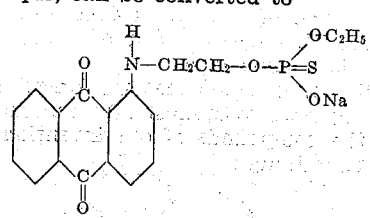

Where B represents an amino group, an O-alkyl group, an O-aryl group, an O-cycloalkyl group, an O-aralkyl group or an O-heterocyclic group, the desired dye compounds are obtained directly without hydrolysis.

Suitable phosphating agents which may be employed in addition to those included in the above general formulae are phosphorus sulfochloride, PSCl₃, phosphorus sulfobromide, PSBr₃, and phosphorus pentasulfide, P₂S₅.

It should be here noted that while B, R, R₁ and X have been described as representing, among other things, an amino group, they are not limited to an unsubstituted amino group, and amino as used herein and in the claims (unless otherwise indicated) is intended to include substituted amino such as alkylamino, for example, as well. That this is so is apparent from an examination of the examples given. These show substituted amino groups.

In accordance with the above teachings, phosphating compounds having the general formula:

wherein D represents hydrogen or an alkyl group may be employed. These can be prepared by reacting, in equal molecular proportions, phosphorus oxychloride with a compound having the general formula:

wherein D represents hydrogen or an alkyl group. Phosphorus oxychloride can be reacted, for example, with ammonia, methylamine, ethylamine, dimethylamine and ethanolamine to obtain

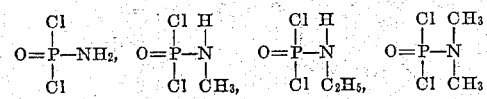

and

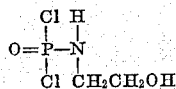

respectively. The corresponding thiophosphoric compounds can be obtained by substituting phosphorus sulfochloride for phosphorus oxychloride.

Representative thiophosphoric acid ester groups include, for example,

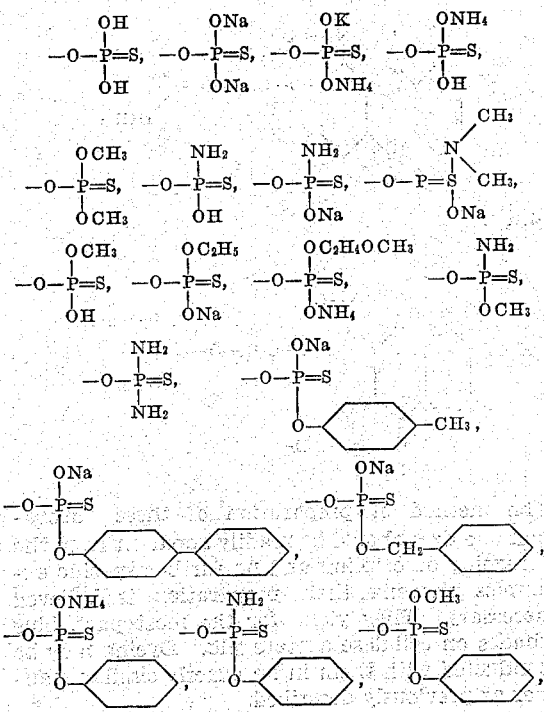

and

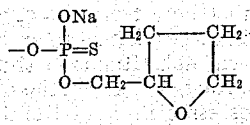

The preparation of these anthraquinone thiophosphoric acid ester compounds can be illustrated by reference to Examples 1, 2, 3, 4, 5, 6, 7, 8, 9, 10, 11, 12, 13, 14, 15, 16, 17, 23, 24, 26, 28, 30, 31 and 32 since, if the double bonded oxygen atom connected to the phosphorus atom of the phosphating compound of each of these examples is replaced by an atom of sulfur and the general procedure described in the examples is followed, corresponding thiophosphoric acid ester compounds can be obtained.

The preparation of these thiophosphoric acid ester anthraquinone compounds will be made still more clear by the following example:

*Example 33*

3.3 grams of 1,4-di-β-hydroxyethylaminoanthraquinone are dissolved in 50 cc. of pyridine and 2.5 grams of monoamyl thiophosphoryl chloride dissolved in 25 cc. of pyridine are slowly added while the reaction mixture is well agitated. The reaction mixture is heated on a water bath at 70° C. for seven hours after which it is permitted to stand overnight at room temperature. The mixture resulting is poured into 200 cc. of a dilute sodium carbonate solution and the resulting solution is evaporated to a volume of 50 cc. under reduced pressure. During this evaporation, the desired product crystallizes from solution and may be recovered by filtration, washed with water and dried. A yield of 4.5 grams is obtained. By the above treatment, one of the β-hydroxyethylamino groups originally present is converted to a group having the following probable formula:

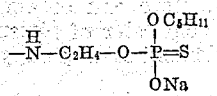

If 2.2 grams of

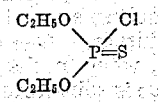

are substituted for the monoamyl thiophosphorochloride of the above example, an anthraquinone dye is obtained in which one of the β-hydroxyethylamino groups originally present is converted to a group having the probable formula:

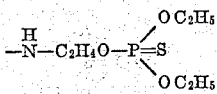

A yield of 4 grams is obtained. In this case, the dye does not crystallize upon evaporation of the solution. However, the dye can be obtained by extraction of the residue with ethyl alcohol filtering the ethyl alcohol extract and evaporating off the alcohol to obtain the dye.

From the foregoing, the method of preparation of the anthraquinone dyes containing a thiophosphoric acid ester group should be readily apparent and no further specific examples showing their preparation is deemed necessary. These dyes may be employed for dyeing in an exactly similar manner as described in connection with the acid ester of phosphorus dyes of our invention. Further, we have discovered that aminoanthraquinone compounds containing an acid ester of phosphorus group or a thiophosphoric acid ester group (these terms having the meaning given hereinbefore) joined to an oxygen atom which is a nuclear substituent of the anthraquinone nucleus through an aliphatic, cycloalkyl, or aryl radical, possess utility for the dyeing of organic derivatives of cellulose, wool and silk. Generally speaking those compounds wherein the connecting linkage is an aliphatic radical are advantageous.

When these compounds are to be employed for the dyeing of organic derivatives of cellulose, such as cellulose acetate silk, they should not contain a nuclear sulfonic acid group and preferably no carboxylic acid group should be present in the anthraquinone nucleus. Compounds of this character wherein R and R₁ of the

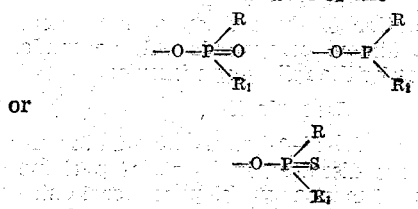

or group both represent an O-X group have not been found to be of much utility for the dyeing of organic derivatives of cellulose. Both the sulfonated and unsulfonated compounds appear to possess rather general applicability for the coloration of silk and wool.

The nuclear oxygen atom may be present in either an alpha or beta position. As above indicated an amino group must also be present. One or more amino groups may be present. Ordinarily the amino group or groups is present in an alpha position. Said amino group or groups can be substituted with an alkyl, aralkyl, cycloalkyl or aryl radical, for example. It will be understood that the connecting linkages more fully described hereinbefore can be employed. Similarly the same acid ester of phosphorus groups or thiophosphoric acid ester groups may be present.

The anthraquinone compounds in question can be prepared by reacting an aminoanthraquinone compound containing an —O— (aliphatic, cycloalkyl, aryl) group, wherein the aliphatic, cycloalkyl or aryl nucleus is substituted with a hydroxy group, with a compound have the general formula

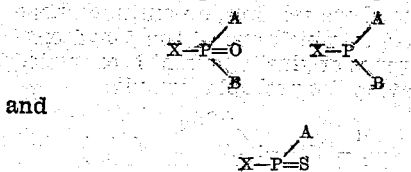

and wherein A, B and X have the meaning previously assigned to them. These reactions can be carried out in accordance with the procedure set forth in the preceding examples.

The preparation of the particular compounds in question will be made still more clear by the following example:

*Example 34*

34 grams of 1-methylamino-4-ethylamino-2-β-hydroxyethoxyanthraquinone are treated in 400 cc. of dry tetrachloroethane with 1 gram equivalent of

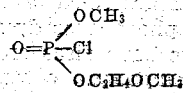

The reaction mixture is warmed to complete the reaction. The dye compound can be be recovered in known fashion and has the probable formula:

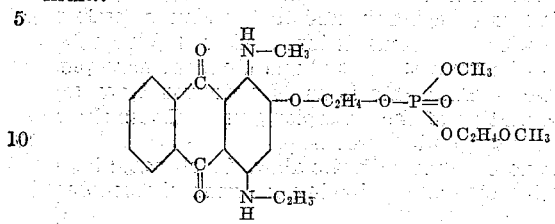

It dyes cellulose acetate silk a violet blue shade.

As illustrative of other anthraquinone dyes containing the grouping in question may be mentioned:

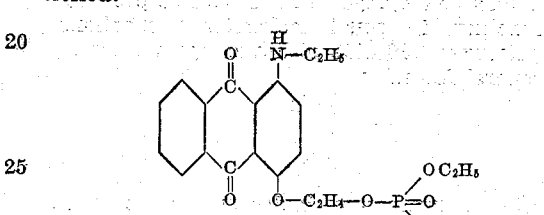

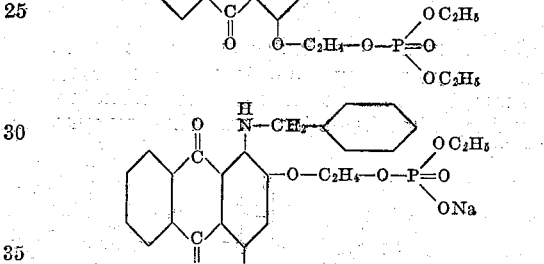

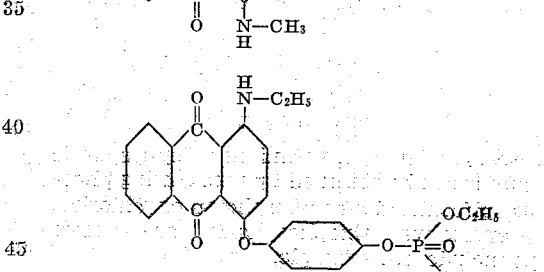

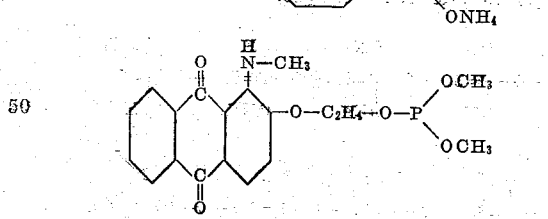

and

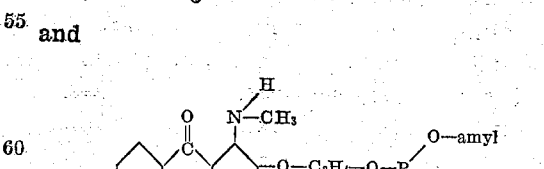

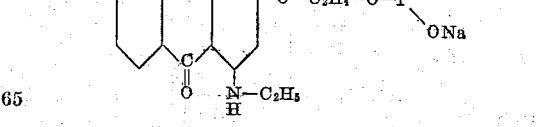

The method of preparation of these anthraquinone dyes should be readily apparent from the foregoing description and no further specific examples showing their preparation is believed necessary. They yield, for the most part, blue shades on cellulose acetate silk. Dyeing may be conducted with them in an exactly similar manner as previously described.

We claim:
1. An anthroquinone compound having the general formula:

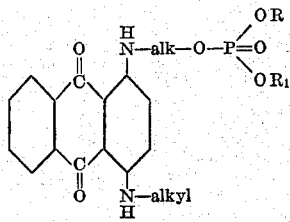

wherein alk represents an alkylene radical, R represents a member selected from the group consisting of hydrogen and a water-soluble salt forming group and $R_1$ represents an alkyl group.

2. An anthraquinone dye compound having the general formula:

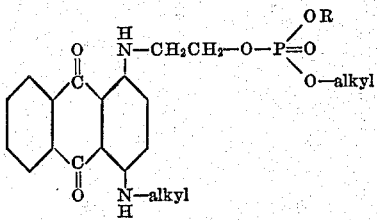

wherein R represents a member selected from the group consisting of hydrogen and a water-soluble salt-forming group.

3. The anthraquinone dye compound which in its sodium salt form has the formula:

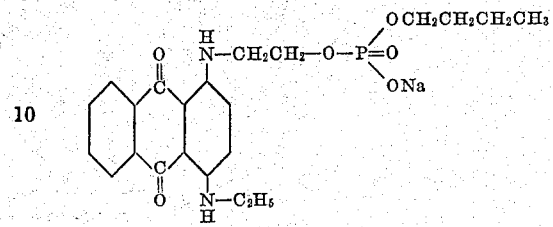

4. The anthraquinone dye compound which in its sodium salt form has the formula:

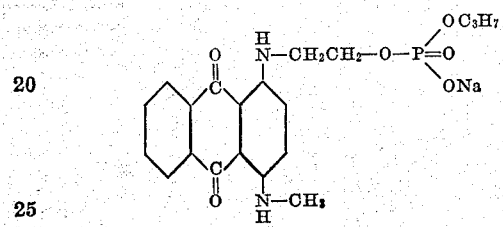

JAMES G. McNALLY.
JOSEPH B. DICKEY.